US012089273B2

United States Patent
Abe et al.

(10) Patent No.: US 12,089,273 B2
(45) Date of Patent: Sep. 10, 2024

(54) MOBILE TERMINAL COMMUNICATION SYSTEM FOR VEHICLE AND VEHICLE SEAT

(71) Applicant: TOYOTA BOSHOKU KABUSHIKI KAISHA, Aichi (JP)

(72) Inventors: Hiroki Abe, Aichi (JP); Yuki Kamiya, Aichi (JP); Osamu Kawase, Aichi (JP); Yasuhiro Ishiguro, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 330 days.

(21) Appl. No.: 17/675,147

(22) Filed: Feb. 18, 2022

(65) Prior Publication Data

US 2022/0295582 A1 Sep. 15, 2022

(30) Foreign Application Priority Data

Mar. 12, 2021 (JP) .................................. 2021-040491

(51) Int. Cl.
*H04W 76/14* (2018.01)
*B60N 2/00* (2006.01)

(52) U.S. Cl.
CPC ............ *H04W 76/14* (2018.02); *B60N 2/002* (2013.01)

(58) Field of Classification Search
CPC ......... H04W 76/14; B60N 2/002; B60N 2/26; B60R 21/207; B60R 21/015; B60Q 9/00
See application file for complete search history.

(56) References Cited

U.S. PATENT DOCUMENTS

2018/0293401 A1* 10/2018 Weimerskirch ... B60R 21/01512
2019/0202444 A1* 7/2019 Golgiri ................. G05D 1/027

FOREIGN PATENT DOCUMENTS

| JP | 2004084254 A | * | 3/2004 |
| JP | 2011-101118 | | 5/2011 |
| JP | 5835124 | | 12/2015 |
| JP | 2020-128174 | | 8/2020 |

OTHER PUBLICATIONS

Office Action issued in Corresponding JP Patent Application No. 2021-040491, dated Jan. 9, 2024, along with an English translation thereof.

\* cited by examiner

*Primary Examiner* — Dinh Nguyen
(74) *Attorney, Agent, or Firm* — Greenblum & Bernstein, P.L.C.

(57) ABSTRACT

A mobile terminal communication system for a vehicle that enables pairing between a mobile terminal and a seat while inhibiting an increase in equipment installed in the seat is provided. In one aspect of the disclosure, the system includes seats that each configured to output first information in relation to a motion of an occupant; and a processor that communicates with the seats and a mobile terminal possessed by a person in the vehicle. The processor includes a comparison processing device that estimates a control-target seat, on which the person is seated, among the seats by comparing the first information outputted by each seat with second information in relation to the motion of the person outputted by the mobile terminal; and a pairing processing device that pairs the estimated control-target seat with the mobile terminal and to transmit an output of the paired mobile terminal to the control-target seat.

5 Claims, 5 Drawing Sheets

MOBILE TERMINAL COMMUNICATION SYSTEM FOR VEHICLE AND VEHICLE SEAT

CROSS-REFERENCE TO RELATED APPLICATIONS

This application claims the benefit of Japanese Patent Application No. 2021-040491 filed on Mar. 12, 2021 with the Japan Patent Office, the entire disclosure of which is incorporated herein by reference.

BACKGROUND

The present disclosure relates to a mobile terminal communication system for a vehicle and a vehicle seat.

A communication system that identifies a mobile terminal possessed by an occupant of a seat in a vehicle based on an input to a load sensor of the seat is known (see Japanese Patent No. 5835124).

SUMMARY

In the aforementioned communication system, the seat and the mobile terminal directly communicate with each other. This requires the seat to be equipped with a communication module that performs identification of the mobile terminal and pairing with the mobile terminal. However, the seat has a limited space available to install such communication module. In addition, the manufacturing cost per seat increases by installing the communication module for every single seat.

Preferably, one aspect of the present disclosure is to provide a mobile terminal communication system for a vehicle that enables pairing between a mobile terminal and a seat while inhibiting an increase in equipment installed in the seat.

One mode of the present disclosure is a mobile terminal communication system for a vehicle that includes seats installed in a vehicle, where each seat is configured to output first information in relation to a motion of an occupant; and a processor configured to communicate with the seats and to communicate with a mobile terminal possessed by a person in the vehicle.

The processor includes a comparison processing device configured to estimate a control-target seat, on which the person is seated, among the seats by comparing the first information outputted by each seat with second information in relation to the motion of the person outputted by the mobile terminal; and a pairing processing device configured to pair the control-target seat thus estimated with the mobile terminal and to transmit an output of the paired mobile terminal to the control-target seat.

In such configuration, pairings between the seats and the mobile terminal are performed in the processor. Therefore, it is not necessary to install a communication module in each of the seats to perform pairing with the mobile terminal. This enables a pairing between the mobile terminal and the seat while inhibiting an increase in equipment installed in the seat.

In one mode of the present disclosure, the comparison processing device may be configured to regularly perform obtainment of the first information from each seat and estimation of the control-target seat. The pairing processing device may be configured to stop transmission of an output from the mobile terminal to the control-target seat that is released from the estimation. Due to such configuration, the output from the seat can be automatically stopped when the occupant left the control-target seat.

In one mode of the present disclosure, with respect to a seat-in-motion among the seats on which the occupant has made a motion in an unpaired state with the mobile terminal, the comparison processing device may be configured to place priority on the second information of the mobile terminal that has a pairing history with the seat-in-motion to compare with the first information of the seat-in-motion. Due to such configuration, re-pairing can be processed with a reduced processing load when the occupant who once left is seated again on the same seat.

In one mode of the present disclosure, the pairing processing device may be configured to control contents outputted by the mobile terminal and subsequently transmit the contents to the control-target seat. Due to such configuration, it is possible to implement a function to output the same contents to two or more seats at the same time and a function to restrict the outputted contents separately for each seat.

Another aspect of the present disclosure is a vehicle seat installed in a vehicle. The vehicle seat includes a seat body; a seat sensor configured to output first information in relation to a motion of an occupant on the seat body to a processor; and a seat-communication device configured to communicate with a mobile terminal possessed by a person in the vehicle via the processor.

The processor includes a comparison processing device configured to estimate whether the person is seated on the seat body by comparing the first information with second information in relation to a motion of the person outputted from the mobile terminal; and a pairing processing device configured to pair the seat-communication device with the mobile terminal and transmit an output from the mobile terminal thus paired to the seat-communication device in response to an estimation that the person is seated on the seat body.

In such configuration, the pairing between the vehicle seat and the mobile terminal is performed by the processor. Thus, it is not necessary to install a communication module in the vehicle seat itself for pairing with the mobile terminal. This accordingly enables the pairing between the mobile terminal and the vehicle seat while inhibiting an increase in equipment installed in the vehicle seat.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. First Embodiment

[1-1. Configuration]

Figure 1:
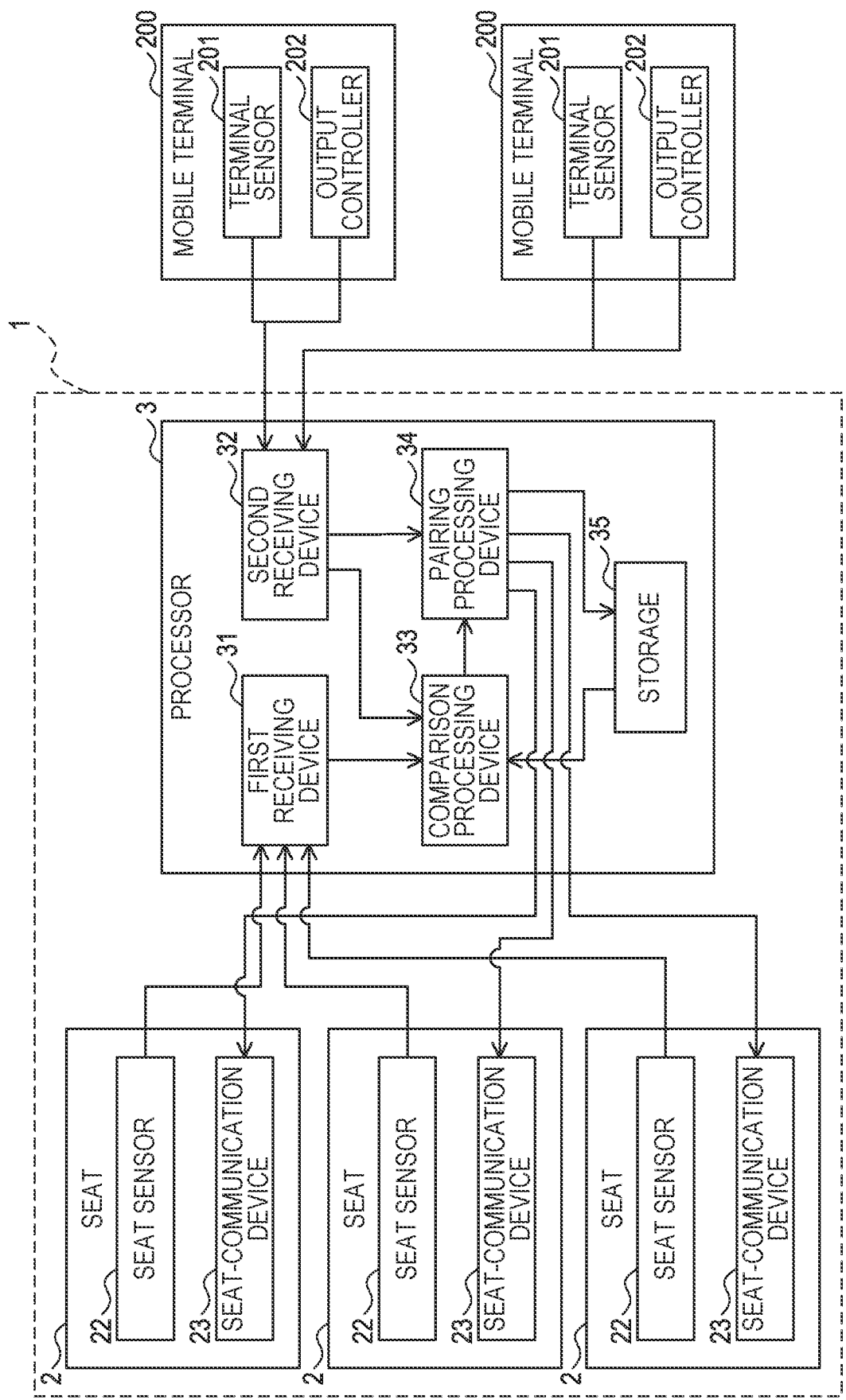
FIG. 1 is a schematic diagram showing a mobile terminal communication system for a vehicle of an embodiment.
Figure 2:
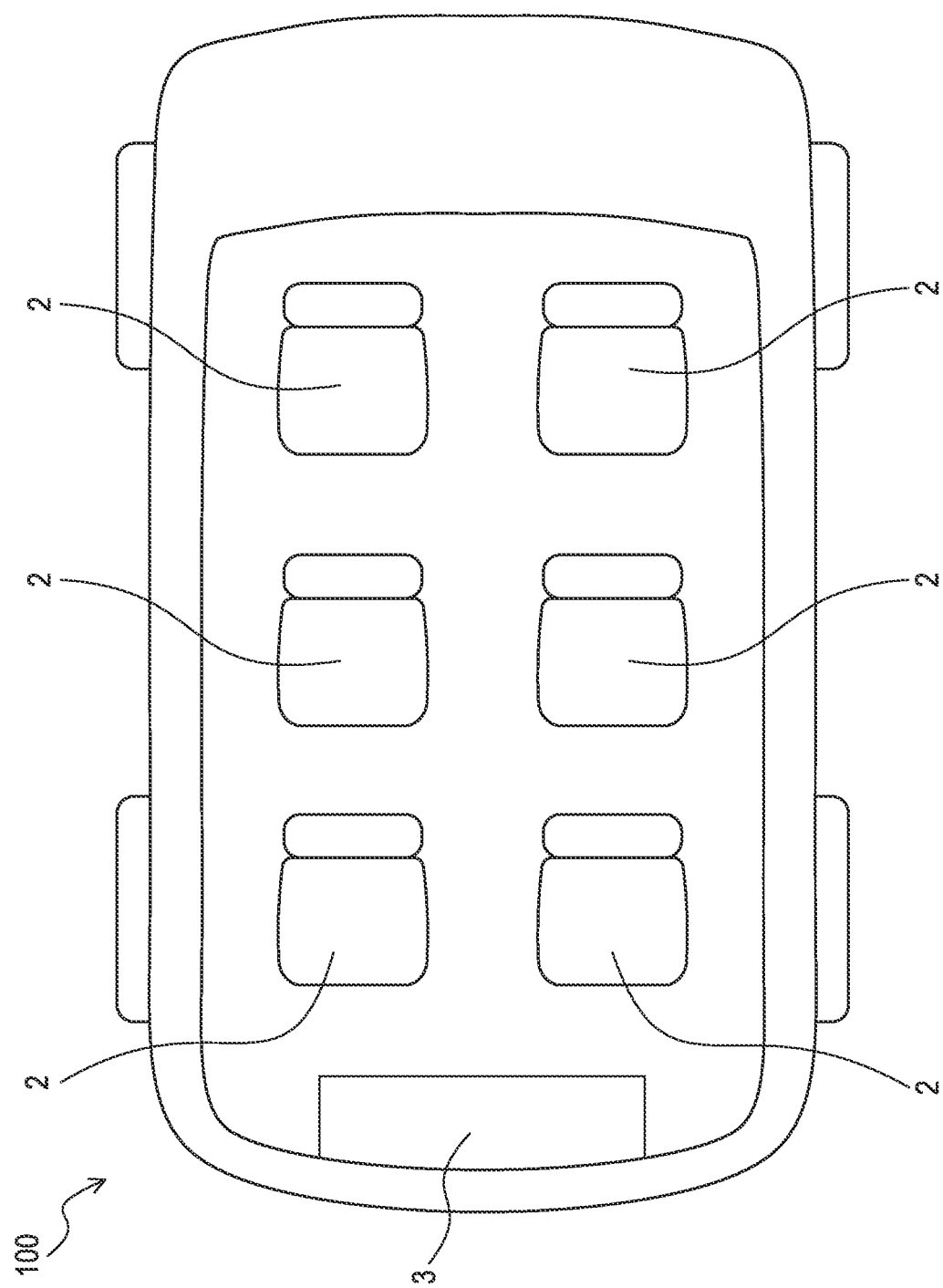
FIG. 2 is a schematic drawing showing the vehicle of FIG. 1.

A mobile terminal communication system 1 for a vehicle shown in FIG. 1 is installed in a vehicle 100 used by persons each of whom possesses a mobile terminal 200 (see FIG. 2). The vehicle 100 in the present embodiment is a passenger car.

<Mobile Terminal>

A mobile terminal 200 is a portable computer that includes, for example, a processor, a storage medium such as a RAM and ROM, and an input/output device. Examples of the mobile terminal 200 include smartphones, tablet computers, and laptop computers. The mobile terminal 200 includes a terminal sensor 201, and an output controller 202.

The terminal sensor 201 is configured to detect a motion of the mobile terminal 200 (i.e., a motion of the person who possesses the mobile terminal 200). The terminal sensor 201 outputs the detected motion of the mobile terminal 200 to a processor 3 as second information in relation to the motion of the person.

For example, an acceleration sensor can be used as the terminal sensor 201. The acceleration sensor outputs three dimensional acceleration as the second information when used as the terminal sensor 201. For example, when the person takes any one of seats 2, acceleration associated with a downward motion of the mobile terminal 200 is continuously outputted to the processor 3.

The output controller 202 is configured to transmit, to the processor 3, contents stored in the mobile terminal 200 or contents delivered to the mobile terminal 200 through a network. Examples of contents transmitted by the output controller 202 include music, screen images, photographic images, texts, and control information of the seat 2.

Data transmission and reception between the mobile terminal 200 (i.e., the terminal sensor 201 and the output controller 202) and the processor 3 is performed via wireless communication. Examples of usable wireless communication include Near Field Communication and wireless LAN.

<Mobile Terminal Communication System>

The mobile terminal communication system 1 includes two or more of the seats 2, and one of the processor 3.

<Seat>

As shown in FIG. 2, the seats 2 are arranged inside the vehicle 100. The person in the vehicle 100 takes a seat on any seat 2 among the seats 2.

Figure 3:
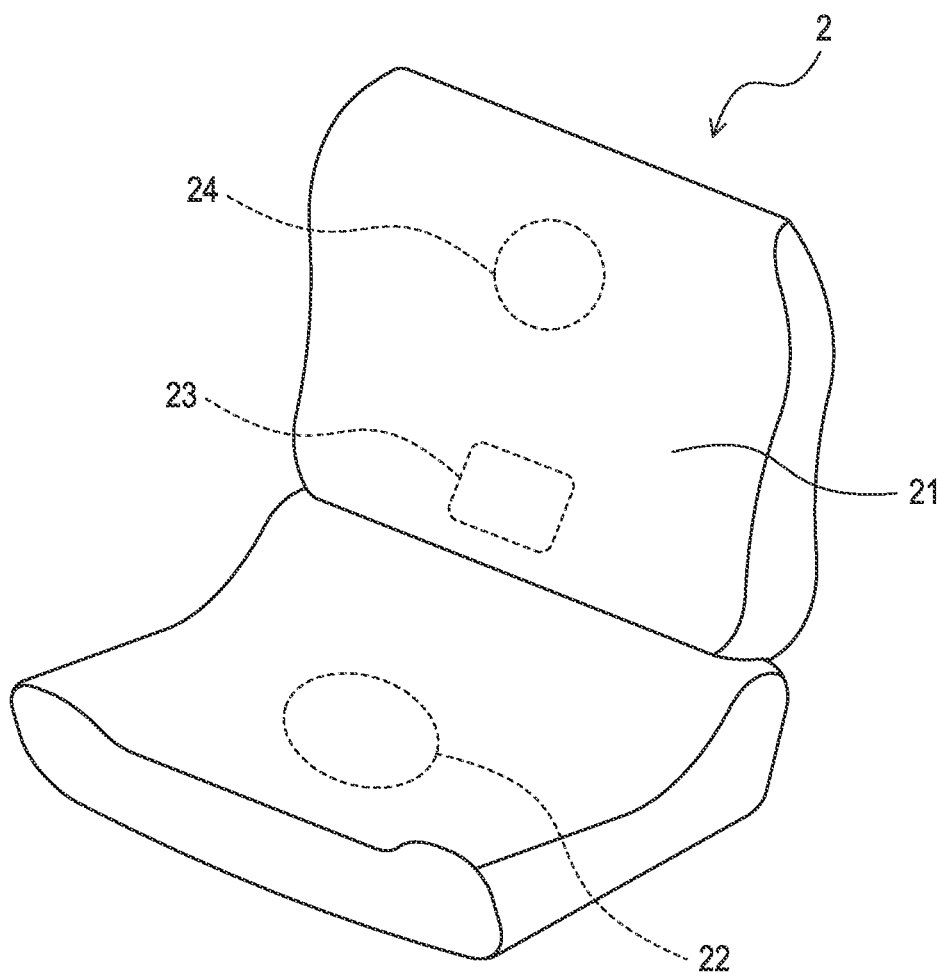
FIG. 3 is a schematic drawing showing a seat of FIG. 1.

As shown in FIG. 3, each seat 2 includes a seat body 21, a seat sensor 22, a seat-communication device 23, and an output device 24. The seat body 21 includes a seat cushion and a seatback that support the person.

The seat sensor 22 is configured to output first information in relation to a motion of the occupant on the seat body 21 (i.e., the person seated on the seat 2) to the processor 3. One example of the seat sensor 22 is an acceleration sensor that is arranged at a portion of the seat body 21 where a load from the occupant is applied as shown in FIG. 3.

When the acceleration sensor is used as the seat sensor 22, three dimensional acceleration is outputted as the first information. In other words, a change in the three dimensional acceleration of the seat body 21 that is caused by the person's sitting on the seat body 21 is continuously outputted to the processor 3.

A load sensor may also be used as the seat sensor 22. In this case, a change in the load applied to the seat body 21 by the person when the person sits on the seat body 21 is continuously transmitted to the processor 3 as the first information.

A depth sensor that recognizes a motion of the occupant by scanning the space may also be used as the seat sensor 22. In this case, depth data showing changes in the position and posture of the occupant is outputted as the first information.

The seat-communication device 23 is configured to communicate with any one mobile terminal 200 present in the vehicle 100 via the processor 3. More specifically, the seat-communication device 23 receives contents transmitted from the output controller 202 of the mobile terminal 200.

The output device 24 is configured to output the contents the seat-communication device 23 received. A speaker installed in the seat body 21 as shown in FIG. 3 is one example of the output device 24. The speaker outputs music or sounds included in the contents.

Examples of the output device 24 may also include a display that outputs screen images or photographic images, and a drive device that controls positions and angles of the seat body 21. The output device 24 may be installed outside of the seat body 21. For example, the output device 24 may be a speaker or a display that is installed around the seat body 21 (for example, on the ceiling, floor, and wall of the vehicle 100; and on a back surface of an adjacent seat body 21).

<Processor>

The processor 3 is configured to communicate with the seats 2 and at least one mobile terminal 200. As shown in FIG. 1, the processor 3 includes a first receiving device 31, a second receiving device 32, a comparison processing device 33, a pairing processing device 34, and a the storage 35.

The processor 3 includes, for example, a processor, a storage medium such as a RAM and ROM, and a computer having an input/output device. The processor 3 is installed inside the vehicle 100. The processor 3 may be placed in an ECU (Electronic Control Unit) of the vehicle 100. A part of the processor 3 may be installed outside the vehicle 100 (i.e., in or on a ground facility).

<Receiving Device>

The first receiving device 31 is configured to receive the first information from the seat sensor 22 of each of the seats 2. The first receiving device 31 forwards the received first information to the comparison processing device 33.

The second receiving device 32 is configured to receive terminal identification information, the second information, and contents from at least one mobile terminal 200. The second receiving device 32 forwards the received terminal identification information and the received second information to the comparison processing device 33 and forward the received contents to the pairing processing device 34.

<Comparison Processing Device>

The comparison processing device 33 is configured to estimate a control-target seat among the seats 2 by comparing the first information outputted by each seat 2 and the second information outputted by the mobile terminal 200.

The "control-target seat" is the seat that is taken by the person who possesses the mobile terminal 200 that underwent the comparison of the second information (i.e., that received the terminal identification information). The comparison processing device 33 outputs seat identification information of the estimated control-target seat and the terminal identification information of the mobile terminal 200 to the pairing processing device 34.

More specifically, the comparison processing device 33 compares each of the first information received from the seat sensor 22 of each seat 2 with the second information received from the terminal sensor 201 of the mobile terminal 200.

If the first information that matches the second information is found, the comparison processing device 33 estimate that the seat 2 that outputted that first information as the "control-target seat". Meanwhile, if no first information that matches the second information is found, the comparison processing device 33 estimates that there is no "control-target seat" (i.e., no person is yet seated or the person has left the seat).

If two or more persons each possessing the mobile terminal 200 are present in the vehicle 100, the comparison processing device 33 estimates the "control-target seat" that corresponds to each mobile terminal 200 by comparing the second information of all of the mobile terminals 200 with the first information of each seat 2. In other words, the comparison processing device 33 estimates, with respect to each seat 2, whether any person is seated in the seat body 21.

Each of the first information and the second information is an aggregate of sensor outputs having a temporal axis (for example, a waveform showing a temporal change in the sensor outputs). The comparison between the first information and the second information is performed by, for example, determining approximations by means of algorithms such as of AI (artificial intelligence). The comparison processing device 33 determines that the first information and the second information match each other if the difference between the first information and the second information that can be obtained as a result of the comparison is smaller than a predetermined threshold value.

The comparison processing device 33 is configured to regularly perform obtainment of the first information from each seat 2 and estimation of the control-target seat. In other words, the comparison processing device 33 regularly performs maintaining and releasing of the control-target seat.

In response to a seat that is in motion (seat-in-motion) among the seats 2 on which the occupant has made a motion in an unpaired state with the mobile terminal 200, the comparison processing device 33 is configured to place priority on the second information of the mobile terminal 200 that has a pairing history with the seat-in-motion to compare with the first information of the seat-in-motion. The pairing history of the mobile terminal 200 with the seats 2 is stored in the storage 35.

Among the seats 2 that are not estimated as the "control-target-seats", the "seat-in-motion" is a seat that has outputted the first information including a seating motion of the person. In other words, the "seat-in-motion" is a seat that is estimated as changing from a vacant state to a seated state. Whether the first information includes the seating motion of the person is determined, for example, by means of algorithms such as of AI.

In response to detecting the seat-in-motion, the comparison processing device 33 obtains the second information from the mobile terminal 200 that has a paring history with this seat-in-motion and compares the second information with the first information of this seat-in-motion. If the second information of the mobile terminal 200 that has a paring history with the seat-in-motion cannot be obtained, or the second information of the mobile terminal 200 that has a paring history with the seat-in-motion does not match the first information of the seat-in-motion, the comparison processing device 33 compares the first information of the seat-in-motion with the second information of other mobile terminals 200.

In addition to the case where the first information of the control-target-seat does not match the second information, the comparison processing device 33 releases the estimation of the control-target-seat in a case where the output from the seat sensor 22 of the control-target seat is interrupted for a given period of time (i.e., when the first information cannot be obtained). In other words, the comparison processing device 33 estimates that the seat 2 that has been estimated as being the control-target seat is no longer the control-target-seat and outputs a notification of release of estimation to the paring processing device 34.

<Pairing Processing Device>

The pairing processing device 34 is configured to pair the control-target-seat thus estimated by the comparison processing device 33 with the mobile terminal 200 and transmit the output of the paired mobile terminal 200 to the control-target seat.

More specifically, for each seat 2, in response to an estimation that the person is seated on the seat body 21 (i.e., that the seat 2 is the control-target seat), the pairing processing device 34 is configured to pair the seat-communication device 23 with the mobile terminal 200 and transmit the output (i.e., contents) from the output controller 202 of the paired mobile terminal 200 to the seat-communication device 23.

The contents transmitted to the seat-communication device 23 by the pairing processing device 34 is outputted or performed by the output device 24 of the seat 2. In a case where the contents is not outputted from the mobile terminal 200, the pairing processing device 34 does not transmit the contents to the seat 2 but maintains pairing between the seat 2 and the mobile terminal 200.

The pairing processing device 34 is also configured to control the contents outputted from the mobile terminal 200 and subsequently transmit the contents to the control-target seat. For example, the pairing processing device 34 has a function to set sound volumes and contents restrictions (for example, parental control) separately for each seat 2. The pairing processing device 34 may also has a function to select the contents outputted at the seats 2.

The pairing processing device 34 may have a function to transmit the contents outputted from one of the mobile terminals 200 to two or more of the seats 2. This enables the contents to be shared between two or more occupants and enables services such as enhanced realistic sound provided through two or more speakers.

The contents control by the pairing processing device 34 can be performed by an input device provided in the processor 3 or by an input from the mobile terminal 200 that is coupled to the processor 3.

The pairing processing device 34 is configured to stop the transmission of the output from the mobile terminal 200 to the control-target seat that is released from estimation by the comparison processing device 33. Along with stopping the transmission of the output, the pairing processing device 34 also cancel the paring between the mobile terminal 200 and the control-target seat released from estimation.

Each time a paring is performed, the pairing processing device 34 stores a paring history (i.e., a combination of the seat 2 and the mobile terminal 200) in the storage 35.

[1-2. Process]

Hereinafter, one example of the communication processing performed by the processor 3 will be explained with reference to the flow diagram shown in FIG. 4.

Figure 4:
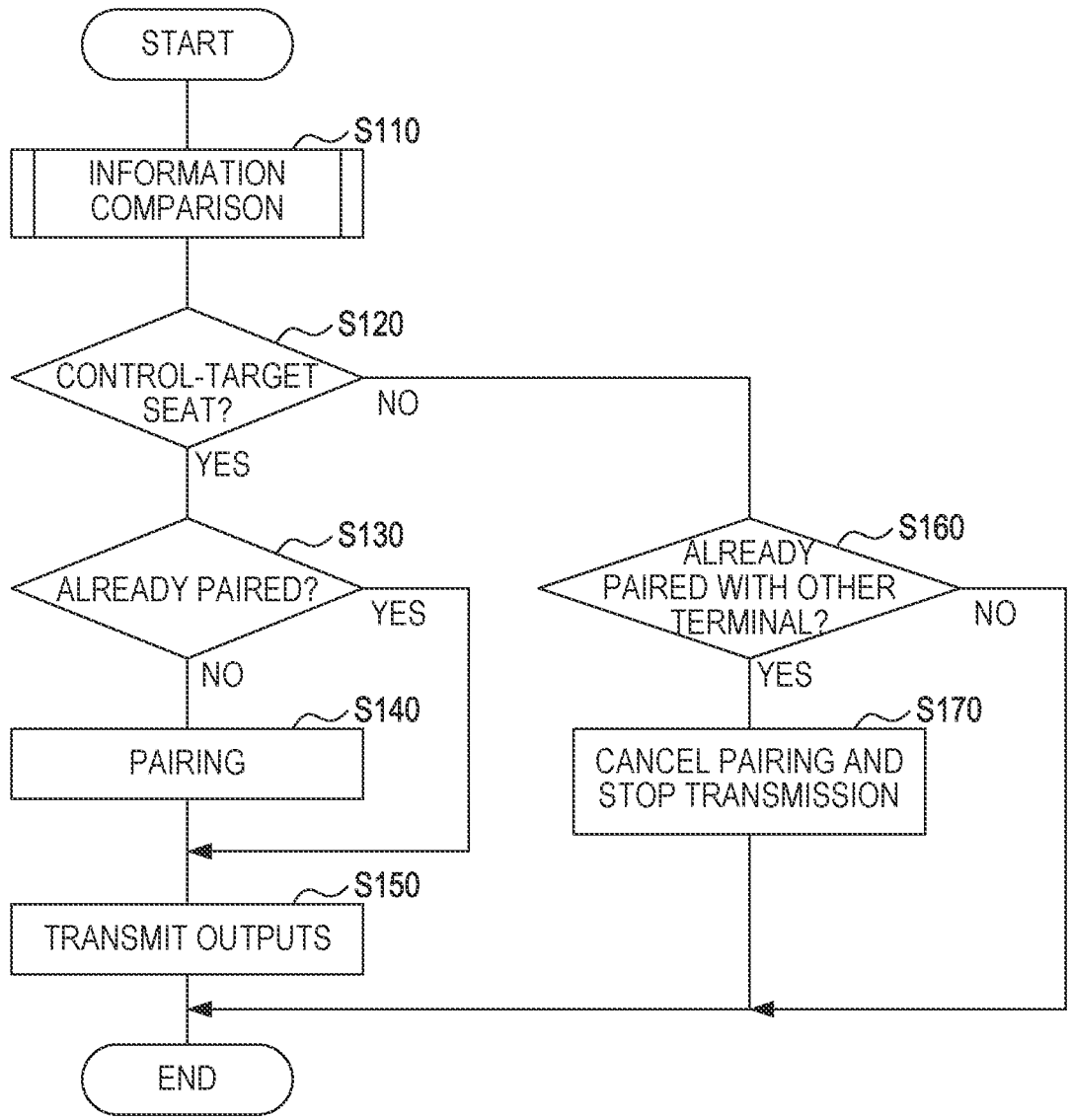
FIG. 4 is a diagram schematically showing a flow of communication processing performed by a processor of FIG. 1.

The flow diagram of FIG. 4 shows communication processing performed on one of the seats 2. The processor 3 performs this communication processing on every one of the seats 2 in parallel or in series. In addition, this communication processing is performed regularly and repeatedly.

In the communication processing, the processor 3 begins by performing an information comparison processing in which the first information and the second information are compared to each other (Step (S) 110).

Figure 5:
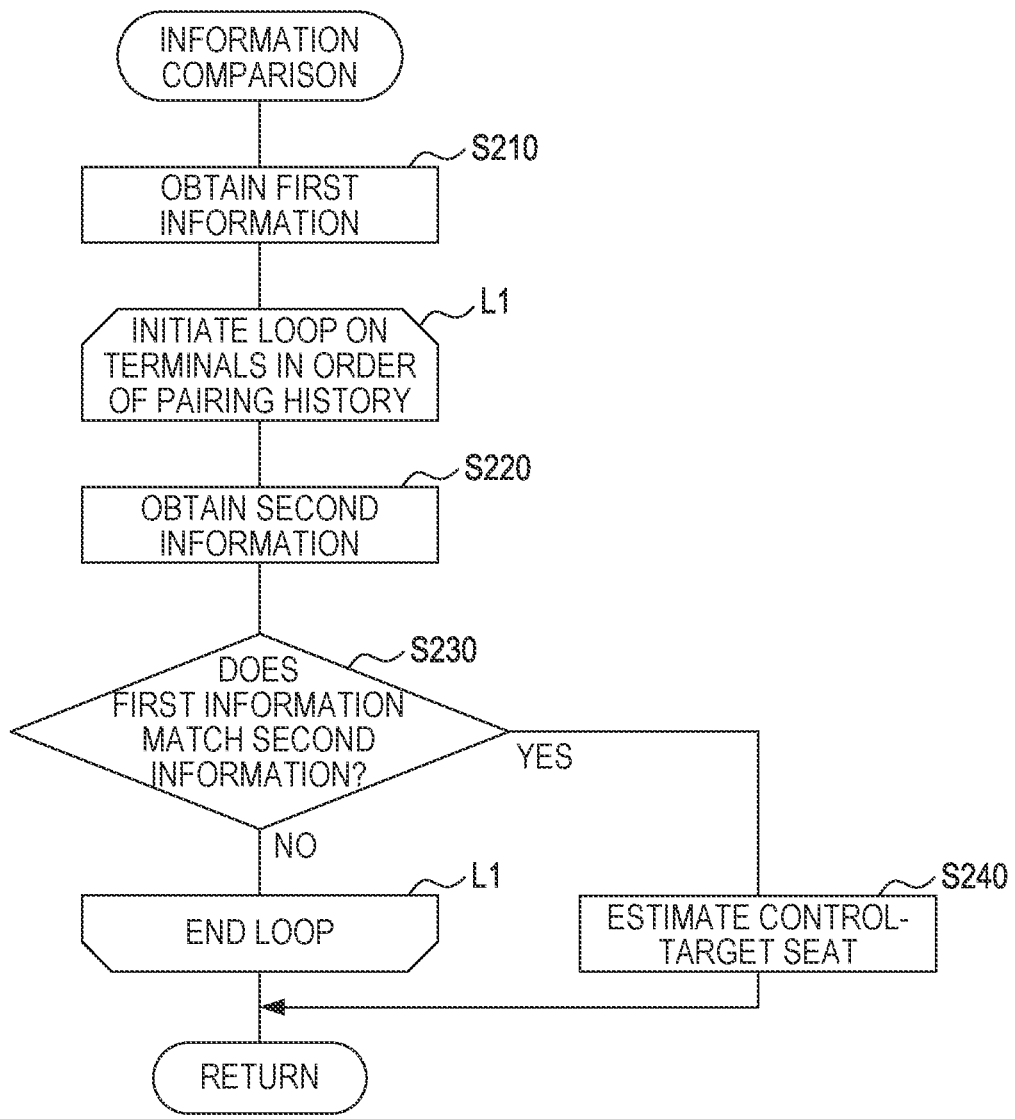
FIG. 5 is a diagram schematically showing a flow of information comparison processing performed in the communication processing of FIG. 4.

As shown in FIG. 5, in the information comparison processing, the processor 3 first obtains the first information from the seat 2 that is the processing target (S210). After obtaining the first information, the processor 3 repeats (Loop (L) 1) obtaining the second information (S220) and comparing the first information with the second information (S230) for every one of the mobile terminals 200 that are present in the vehicle 100.

In the Loop L1, the processor 3 selects the mobile terminal 200 that has a pairing history with the processing-target seat 2 with priority and performs the obtainment of the second information (S220) and the comparison between the first information and the second information (S230).

In the comparison between the first information and the second information (S230), the processor 3 determines whether the first information matches the second information. If the first information matches the second information (S230: YES), the processor 3 then estimates that the processing-target seat 2 is the control-target seat of the mobile terminal 200 (S240). If the control-target seat has been estimated, the processor 3 ends the Loop L1 and ends the information comparison processing without performing the obtainment of the second information from the rest of the mobile terminals 200 and the comparison with the first information.

Meanwhile, if the first information does not match the second information (S230: NO), the processor 3 moves to another one of the mobile terminals 200 and repeats the obtainment of the second information (S220) and the comparison between the obtained second information and the first information (S230).

If the processor 3 does not estimate the control-target seat after comparing information with all of the mobile terminals 200 (i.e., no second information that matches the first information was found), the processor 3 ends the information comparison processing concluding that the processing-target seat 2 is not the control-target seat.

As shown in FIG. 4, after the information comparison processing, the processor 3 determines whether the processing-target seat 2 is the control-target seat of any one of the mobile terminals 200 based on the result of the information comparison processing (S120).

If the processing-target seat 2 is the control-target seat (S120: YES), the processor 3 determines whether the control-target seat has already been paired with a corresponding mobile terminal (S130). The "corresponding mobile terminal" here indicates the mobile terminal 200 the second information of which matched the first information in the information comparison processing.

If the control-target seat has not yet been paired with the corresponding mobile terminal (S130: NO), the processor 3 pairs the control-target seat with the corresponding mobile terminal 200 (S140). After the pairing, the processor 3 transmits the output from the paired mobile terminal 200 to the control-target seat (i.e., to the processing-target seat 2) (S150).

The case where the control-target seat has not yet been paired with the corresponding mobile terminal includes those where the control-target seat is paired with the mobile terminal 200 different from the corresponding mobile terminal. In such case, the connection between the control-target seat and the different mobile terminal 200 is cancelled.

Meanwhile, if the control-target seat has already been paired with the corresponding mobile terminal (S130: YES), the processor 3 performs the transmission of the output (S150) without performing the pairing (S140) and has the control-target seat continue its output.

If the processing-target seat 2 is not the control-target seat (S120: NO), the processor 3 determines whether the processing-target seat 2 is paired with any one of the mobile terminals 200 (S160).

If the processing-target seat 2 is paired with one of the mobile terminals 200 (S160: YES), the processor 3 cancels the pairing and stops the transmission of the output from the mobile terminal 200 (S170). A state where the processing-target seat 2, which is not estimated as being the control-target seat, is paired with the mobile terminal 200 is caused when the person who had been seated on such processing-target seat 2 left the seat. Meanwhile, if the processing-target seat 2 is not paired with one of the mobile terminal 200 (S160: NO), the steps of cancelling the pairing and stopping the transmission are skipped.

[1-3. Effects]

According to the embodiment that has been explained above in detail, the following effects can be obtained.

(1a) Because the pairing between the seats 2 and the mobile terminals 200 is performed by the processor 3, it is not necessary to install a communication module in each of the seats 2 to perform pairing with the mobile terminals 200. This enables the pairing between the mobile terminals 200 and the seats 2 while inhibiting an increase in equipment installed in the seat 2.

(1b) Because the comparison processing device 33 regularly performs the obtainment of the first information from each seat 2 and the estimation of the control-target seat, the output from the seat 2 can be automatically stopped when the occupant left the control-target seat.

(1c) Because the comparison processing device 33 places priority on the second information of the mobile terminal 200 that has a pairing history with the seat-in-motion to compare with the first information of the seat-in-motion, re-pairing can be processed with a reduced processing load when the occupant who once left is seated again on the same seat 2.

(1d) Because the pairing processing device 34 first controls the contents outputted from the mobile terminal 200 and subsequently transmits the contents to the control-target seat, it is possible to implement a function to output the same contents to two or more of the seats 2 at the same time and a function to restrict the outputted contents separately for each seat 2.

2. Other Embodiments

An embodiment of the present disclosure has been explained above. Nevertheless, the present disclosure can be carried out in various modifications without being limited to the aforementioned embodiment.

(2a) In the mobile terminal communication system for the vehicle of the above embodiment, the processor does not necessarily have to regularly perform the estimation and the pairing of the control-target seat. For example, the processor may be configured to perform the estimation and the pairing of the control-target seat upon receiving a request from the person in the vehicle.

(2b) In the mobile terminal communication system for the vehicle of the above embodiment, the processor does not necessarily have to have a function to control the contents outputted from the mobile terminal.

(2c) The vehicle seat of the above embodiment can also be applied to a use in motor vehicles other than passenger cars and a use in vehicles other than motor vehicles such as railroad vehicles, ships and boats, and aircrafts.

(2d) Functions of one element in the aforementioned embodiments may be achieved by two or more elements. Functions of two or more elements may be integrated into one element. A part of the configuration in the aforementioned embodiments may be omitted. At least a part of the configuration in the aforementioned embodiments may be added to or replaced with other part of the configuration in the aforementioned embodiments. It should be noted that any and all modes included in the technical ideas that are identified by the languages recited in the claims are embodiments of the present disclosure.

What is claimed is:

1. A mobile terminal communication system for a vehicle, the system comprising:
    seats installed in a vehicle wherein each seat is configured to output first information in relation to a motion of an occupant; and
    a processor configured to communicate with the seats and to communicate with a mobile terminal possessed by a person in the vehicle,
    wherein the processor includes:
        a receiving device configured to receive, from the mobile terminal, an output including second information in relation to the motion of the person outputted by the mobile terminal;
        a comparison processing device configured to estimate a control-target seat, on which the person is seated, among the seats by comparing the first information outputted by each seat with the second information, and
        a pairing processing device configured to pair the control-target seat thus estimated with the mobile terminal and to transmit an output of the paired mobile terminal to the control-target seat.

2. The mobile terminal communication system for vehicle according to claim 1,
    wherein the comparison processing device is configured to regularly perform obtainment of the first information from each seat and estimation of the control-target seat, and
    wherein the pairing processing device is configured to stop transmission of an output from the mobile terminal to the control-target seat that is released from the estimation.

3. The mobile terminal communication system for vehicle according to claim 1,
    wherein, with respect to a seat-in-motion among the seats on which the occupant has made a motion in an unpaired state with the mobile terminal, the comparison processing device is configured to place priority on the second information of the mobile terminal that has a pairing history with the seat-in-motion to compare with the first information of the seat-in-motion.

4. The mobile terminal communication system for vehicle according to claim 1,
    wherein the pairing processing device is configured to control contents outputted by the mobile terminal and subsequently transmit the contents to the control-target seat.

5. A vehicle seat installed in a vehicle, the vehicle seat comprising:
    a seat body;
    a seat sensor configured to output first information in relation to a motion of an occupant on the seat body to a processor; and
    a seat-communication device configured to communicate with a mobile terminal possessed by a person in the vehicle via the processor,
    wherein the processor includes:
        a receiving device configured to receive, from the mobile terminal, an output including second information in relation to the motion of the person outputted by the mobile terminal;
        a comparison processing device configured to estimate whether the person is seated in the seat body by comparing the first information with the second information; and
        a pairing processing device configured to pair the seat-communication device with the mobile terminal and transmit an output from the mobile terminal thus paired to the seat-communication device in response to an estimation that the person is seated on the seat body.

* * * * *